(No Model.) 3 Sheets—Sheet 1.

A. GRAY.
APPARATUS FOR USE IN STARTING RACES.

No. 556,462. Patented Mar. 17, 1896.

(No Model.) 3 Sheets—Sheet 3.

A. GRAY.
APPARATUS FOR USE IN STARTING RACES.

No. 556,462. Patented Mar. 17, 1896.

Witnesses
Fred Walsh
W. Loott Davis

Inventor
Alexander Gray

UNITED STATES PATENT OFFICE.

ALEXANDER GRAY, OF CANTERBURY, NEW SOUTH WALES.

APPARATUS FOR USE IN STARTING RACES.

SPECIFICATION forming part of Letters Patent No. 556,462, dated March 17, 1896.

Application filed January 14, 1895. Serial No. 534,858. (No model.) Patented in New South Wales March 30, 1894, No. 4,945; in Victoria April 7, 1894, No. 11,315; in New Zealand July 18, 1894, No. 6,974; in South Australia September 20, 1894; in Queensland September 26, 1894, No. 2,776, and in England November 5, 1894, No. 21,205.

*To all whom it may concern:*

Be it known that I, ALEXANDER GRAY, horse-trainer, a subject of the Queen of Great Britain, residing at Mount Street, Canterbury, in the British Colony of New South Wales, have invented a new and useful apparatus entitled an Improved Apparatus to be Used for Starting Races, (for which Letters Patent have been granted in the following countries, to wit: Great Britain, No. 21,205, dated November 5, 1894; Queensland, No. 2,776, dated September 26, 1894; New Zealand, No. 6,974, dated July 18, 1894; New South Wales, No. 4,945, dated March 30, 1894; Victoria, No. 11,315, dated April 7, 1894; South Australia, dated September 20, 1894, and that applications for Letters Patent were filed in India on the 22d day of August, 1895, No. 266, and in France on the 22d day of August, 1895, No. 236,994,) of which the following is a specification.

This invention is specially designed for use in starting horse-races; and it consists of a barricade that is placed across the race-track in front of the horses and of appliances in connection therewith whereby the barricade can be instantly removed. The barricade consists of two side frames, from which wires, tapes, or other suitable material are stretched across the track. Each side frame of the barricade is secured to or forms part of a sliding block that can be caused to slide rapidly up an inclined slide by any suitable means. The slides incline upward ahead of the horses, their lower ends being about four feet from the ground and their upper ends at an elevation sufficient to carry the barricade to such a height as to be clear of the jockeys' heads as they pass under. Each sliding block is held at its lower position by means of a trigger or other suitable contrivance, and both triggers are arranged so that they can be operated simultaneously. Suitable contrivances are employed whereby a tension is produced upon the tapes of the barricade when at its lower position.

Figure 1:
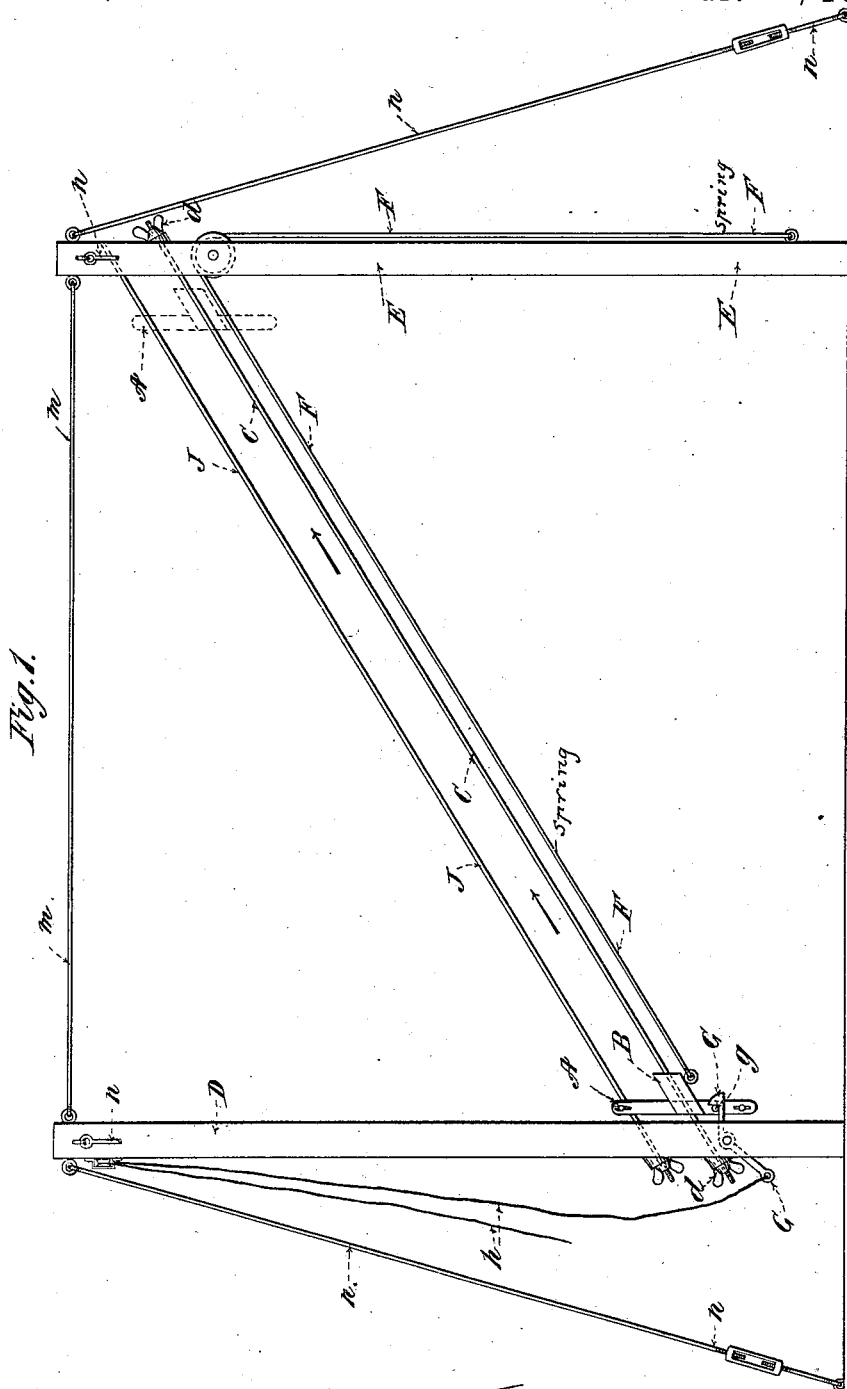
Figure 2:
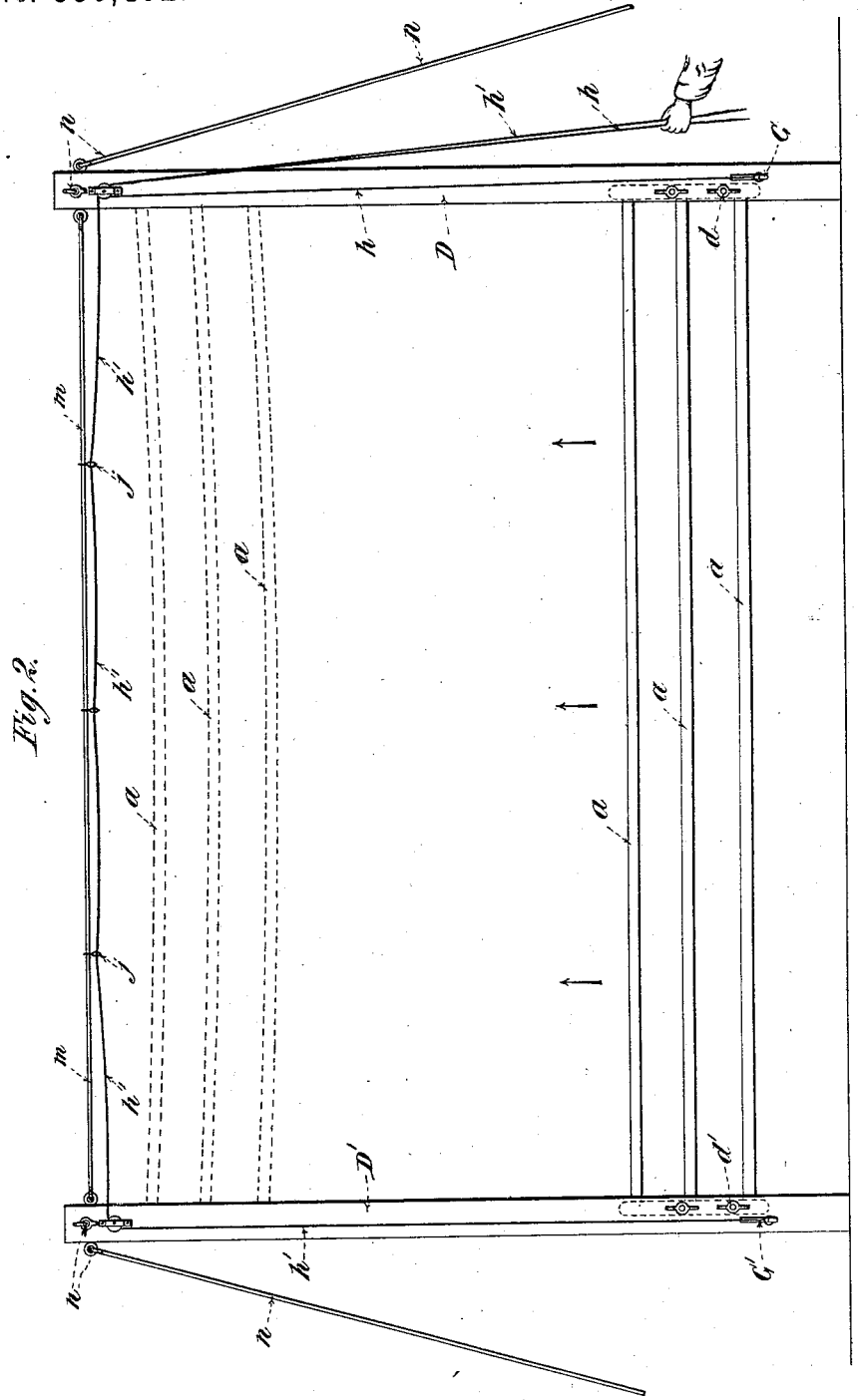
Figure 3:
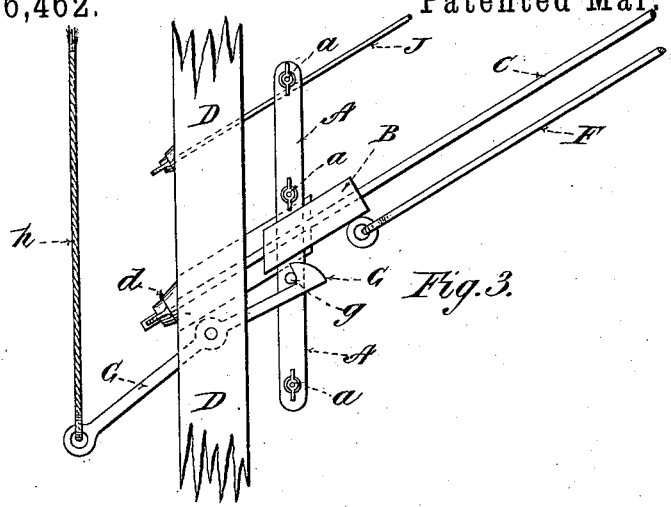
Figure 4:
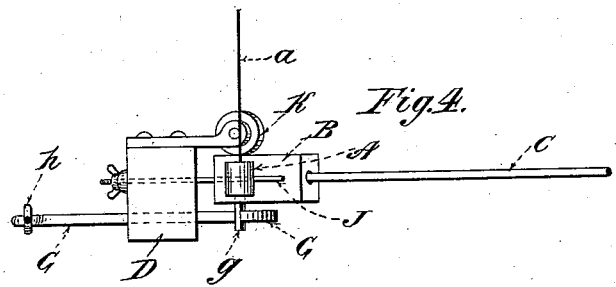
Figure 5:
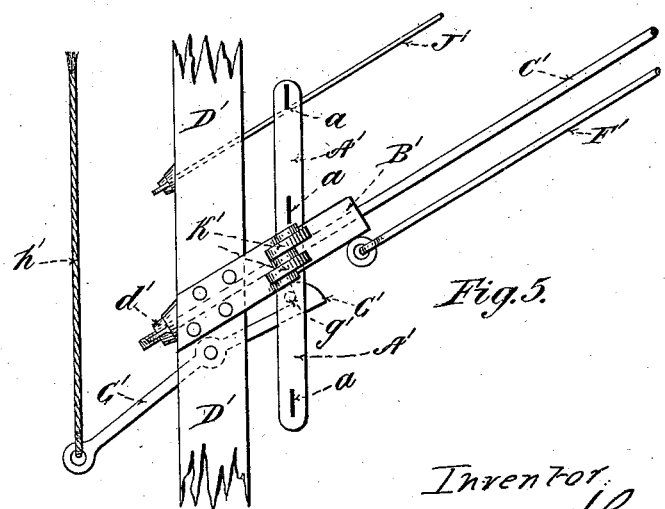

In the accompanying drawings, Figure 1 is a side elevation of my improved apparatus. Fig. 2 is a front elevation of the same. Fig. 3 is an enlarged detail view showing the barricade set. Fig. 4 is a plan of the same. Fig. 5 is a similar detail to Fig. 3, but viewed from inside.

A A' are the vertical side frames of the barricade. *a* are the tapes or other suitable material, the ends of which are secured to the side frames A A'. This barricade stretches across the race-track at the starting-post. Each of the side frames is secured to or forms part of one of two sliding blocks B or B' that run upon parallel inclined slides, one of which is fixed at each side of the race-track, inclining upward ahead of, and from the horses.

I will describe one slide only, as they are exactly alike. C, the inclined slide, is preferably a metal rod. The lower end of the slide C is secured to an upright D, about four feet from the ground. The upper end is secured to another upright E at an elevation sufficient to allow the jockeys to pass clear under the barricade when it is slid up. The slide-rod C can be tightened by the screws *d*. Springs or their equivalents are provided for causing the barricade to slide rapidly up the slides at the starting-signal. The means shown in the drawings consists of long india-rubber springs F F'.

G G' are triggers or catches that engage with projections *g g'* on the sliding blocks B B' and retain the barricade at its lower position in front of the horses. The triggers are operated simultaneously and the barricade released in any convenient manner. That shown in the drawings consists of a couple of cords *h h'*, one of which, *h'*, is led through fair-leads *j* overhead.

The tapes *a* hang comparatively slack after the barricade is released. This facilitates the rapidity of upward motion of the barricade. In order to stretch or make taut the tapes *a* in front of the horses each upright D D' is provided with an antifriction roller or rollers K K', which engage with the inner sides of the side frames A A' when the barricade is at its lower position. The effect of this engagement is to spread the side frames A A' farther apart and thereby produce a tension on the tapes *a*.

Guide-wires J J' are fixed parallel to the slides C in order to prevent the side frames A A' from canting.

The mode of operation is as follows: The barricade being at its highest position and with slack tapes, as shown by dotted lines in Figs. 1 and 2, is hauled down its slides until the side frames A A' engage with the anti-friction-rollers K, which spread the side frames apart and stretch or make taut the tapes. The triggers then fall into place and retain the barricade in its set position with the springs F F' in extension. At the word the triggers release the barricade and it is instantly slid upward out of the way. The uprights D D' and E E' are provided with suitable stays $m$ and guys $n$, whereby the whole structure can be rigidly set up.

If found necessary the upwardly-sliding barricade can be caused to operate a flag denoting the start.

Having now particularly described and ascertained the nature of my said invention and in what manner the same is to be performed, I declare that what I claim is—

1. In apparatus for starting races, the combination, of a pair of slides, one on each side of the race-track, and inclined upward ahead of and from the horses, a barricade and appliances tending to draw the same upward, and means for detaining the barricade.

2. In apparatus for starting races, the combination, of a pair of slides, one on each side of the race-track, and inclined upward ahead of and from the horses, a barricade, substantially as described, springs connected with the barricade and tending to draw the same upward, and catches for detaining the barricade.

3. In apparatus for starting races, the combination, of a barricade and means connected with the same for moving it in a straight line in an upwardly-inclined direction ahead of and from the horses.

4. In apparatus for starting races, the combination, of a pair of slides, one on each side of the race-track, and inclined upward ahead of and from the horses, a barricade, appliances tending to draw the same upward, means for retaining the barricade in its lowest position, and means for tightening the tapes of the barricade when at its lowest point and slacking them when released.

5. In apparatus for starting races, the means for tightening the tapes of the barricade when at its lowest position, and slacking them when the barricade is released, consisting of anti-friction-rollers on the uprights adapted to engage with the side frames of the barricade as herein described.

Dated this 26th day of November, 1894.

ALEXANDER GRAY.

Witnesses:
 FRED WALSH,
 WM. LOVEL DAVIS.